United States Patent
Green

(10) Patent No.: US 12,287,174 B2
(45) Date of Patent: Apr. 29, 2025

(54) AUTO-CENTRE BARREL CAM FOR SMALL OPTICAL SYSTEMS

(71) Applicant: RAYTHEON CANADA LIMITED, Ottawa (CA)

(72) Inventor: Robert Green, Midland (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 561 days.

(21) Appl. No.: 17/752,700

(22) Filed: May 24, 2022

(65) Prior Publication Data

US 2022/0381537 A1 Dec. 1, 2022

Related U.S. Application Data

(60) Provisional application No. 63/192,859, filed on May 25, 2021.

(51) Int. Cl.
*F41G 1/38* (2006.01)
*G02B 23/16* (2006.01)

(52) U.S. Cl.
CPC .............. *F41G 1/38* (2013.01); *G02B 23/16* (2013.01)

(58) Field of Classification Search
CPC .......... F41G 1/38; F41G 11/00; G02B 7/021; G02B 7/04; G02B 23/16
USPC ........................................... 42/115, 125, 126
See application file for complete search history.

(56) References Cited

U.S. PATENT DOCUMENTS

| | | | | |
|---|---|---|---|---|
| 4,172,634 A * | 10/1979 | Thompson | ................ | F41G 1/38 359/422 |
| 6,351,907 B1 * | 3/2002 | Otteman | ................... | F41G 1/38 42/120 |
| 2006/0029378 A1 * | 2/2006 | Noguchi | ................ | G02B 7/021 396/72 |
| 2009/0052069 A1 * | 2/2009 | Kaneko | ................... | G02B 7/021 359/823 |
| 2014/0375868 A1 | 12/2014 | Sasaki | | |
| 2016/0018621 A1 | 1/2016 | Matsumoto | | |
| 2019/0235195 A1 * | 8/2019 | Uemura | ................ | G02B 7/023 |
| 2021/0003907 A1 | 1/2021 | Kondo | | |

FOREIGN PATENT DOCUMENTS

| | | |
|---|---|---|
| JP | H08248287 A | 9/1996 |
| JP | 2010282020 A | 12/2010 |
| WO | 2012132780 A1 | 10/2012 |

OTHER PUBLICATIONS

International Search Report and Written Opinion in Application No. PCT/US2022/030842 dated Sep. 21, 2022 (13 pgs.).

* cited by examiner

*Primary Examiner* — Bret Hayes
(74) *Attorney, Agent, or Firm* — NORTON ROSE FULBRIGHT CANADA LLP

(57) ABSTRACT

An auto-center barrel cam for small optical systems including an outer barrel having a first channel extending longitudinally where the first channel is tapered from an inner surface to an outer surface of the outer barrel at a first angle and an inner barrel within the outer barrel. The inner barrel including a second channel extending longitudinally along the inner barrel where the second channel is tapered from an inner surface to an outer surface of the inner barrel at a second angle. A cam follower includes a flexure part having a first section with a first surface and a second section with a second surface. A spring section pulls the first section and the second section toward each other. The flexure part is arranged to maintain the cam follower within a center of the first and second channels as the inner barrel moves in relation to the outer barrel.

20 Claims, 5 Drawing Sheets

AUTO-CENTRE BARREL CAM FOR SMALL OPTICAL SYSTEMS

REFERENCE TO RELATED APPLICATIONS

This application claims priority to and the benefit of U.S. Provisional Patent Application No. 63/192,859, filed on May 25, 2021, entitled "AUTO-CENTRE BARREL CAM FOR SMALL OPTICAL SYSTEMS," the entire content of which are incorporated herein by reference.

TECHNICAL FIELD

This application relates generally to opto-mechanics and, more particularly, to backlash prevention in opto-mechanical devices.

BACKGROUND

In small scale opto-mechanics a technique to convert rotational motion to linear motion is to use a cam path and a cam follower which is constrained within some linear guide. Typical small opto-mechanical systems include rifle scopes, telescopes, and microscopes. A common problem called backlash occurs when rotation changes from clockwise to counter-clockwise or when a cam path is designed to switch linear directions at some point in the rotation as the cam follower contacts one or the other walls of the cam path.

To solve the backlash on a purely mechanical level, the cam follower must only ever follow a single path because if the follower contacts both walls at the same time and any friction exists the follower will often bind due to an imperfect cam path or it will wear down enough in some places to the point where it will no longer be contacting both walls as it initially did. This typically means it must follow (i.e., contact) only one of the cam path's walls at all times. This can be achieved with something such as a spring forcing the follower to one side. However this proves difficult at a small scale.

Large (e.g., size of a large truck) optical systems such as high-end cosmic telescopes typically use precision servos and anti-backlash gears to solve the problem. Medium size (e.g., size of a skateboard) systems may use two eccentric bearing cam followers turned opposite each other to solve the problem. Small size (e.g., rifle scopes) systems appear to have no true solution for backlash and instead typically rely on tighter tolerances with an acceptable limit of allowed backlash.

Accordingly, there is a need for more reliable ways to avoid backlash in relatively small optical devices or other devices requiring more precise movement and positioning of components.

SUMMARY

The application, in various implementations, addresses deficiencies associated with existing backlash prevention systems. The application includes exemplary backlash prevention techniques arranged to use a barrel cam to ensure more consistent movement of certain components within a relatively small device.

This application describes exemplary auto-center barrel cam devices, systems, and method that use two oppositely tapered cam paths (e.g., a wrapped path and linear path) with a double tapered (e.g., hour-glass like shaped) cam follower which has a flexure spring between opposite tapers which is then placed on a shaft. Since both cam paths and ends of the cam follower are oppositely tapered with a spring pulling it all together, the follower always stays centered within both cam paths and will not bind due to the elastic spring compensating for the imperfect cam path walls.

In various implementations, the cam path and follower technique keeps everything centered and pulling to a common location no matter the rotational direction. It allows for looser tolerances of the cam paths and instead allows the virtual centre or center of the tapered paths to be a technical feature to control rather than the flatness and form of the usual two cam path walls.

In one aspect, an auto-center barrel cam includes an outer barrel having a first channel extending longitudinally along the outer barrel where the first channel is tapered on both a first side and second side from an inner surface to an outer surface of the outer barrel outwardly at a first angle. The cam includes an inner barrel within the outer barrel. The inner barrel has an outer surface adjacent to the inner surface of the outer barrel. The inner barrel includes a second channel extending longitudinally along the inner barrel. The second channel is tapered on both a first side and a second side from an outer surface to an inner surface of the inner barrel inwardly at a second angle. The cam includes a cam follower having a flexure part including a first section with a first surface, a second section with a second surface, and a spring section between the first section and the second section configured to pull the first section and the second section toward each other. The first section is tapered at a third angle opposite the first angle to maintain the first surface in contact with the first tapered channel of the outer barrel and the second section is tapered at a forth angle opposite the second angle to maintain the second surface in contact with the second tapered channel of the inner barrel. The flexure part is arranged to maintain the cam follower within a center of the first and second channels as the inner barrel moves in relation to the outer barrel or visa versa.

The first section and the second section may form an hour-glass like shape. The flexure part may mounted on the cam follower. The cam follower may include a connector arranged to connect the cam follower to a cam follower base. The connector may include a screw part arranged to threadable engage with the cam follower base. The cam follower may include a through hole extending from the first section to the second section. The first channel may extend longitudinally along the outer barrel in at least one of a wrapped and non-linear path. The second channel may extends longitudinally along the inner barrel in a linear path. The first angle and second angle may be between 30 degrees and 90 degrees extending from the inner surface to an outer surface of the inner barrel and outer barrel respectively. The spring section may include a helical spring.

In another aspect, an optical scope for a firearm includes an optical assembly arranged to image a target and an auto-center barrel cam that includes an outer barrel having a first channel extending longitudinally along the outer barrel where the first channel is tapered on both a first side and second side from an inner surface to an outer surface of the outer barrel outwardly at a first angle. The cam includes an inner barrel within the outer barrel. The inner barrel has an outer surface adjacent to the inner surface of the outer barrel. The inner barrel includes a second channel extending longitudinally along the inner barrel. The second channel is tapered on both a first side and a second side from an outer surface to an inner surface of the inner barrel inwardly at a second angle. The cam includes a cam follower having a flexure part including a first section with a first surface, a second section with a second surface, and a spring section between the first section and the second section configured to pull the first section and the second section toward each other. The first section is tapered at a third angle opposite the first angle to maintain the first surface in contact with the first tapered channel of the outer barrel and the second section is tapered at a forth angle opposite the second angle to maintain the second surface in contact with the second tapered channel of the inner barrel. The flexure part is arranged to maintain the cam follower within a center of the first and second channels as the inner barrel moves in relation to the outer barrel or visa versa.

In a further aspect, a method for manufacturing an auto-center barrel cam includes: providing an outer barrel including a first channel extending longitudinally along the outer barrel, the first channel being tapered on both a first side and second side from an inner surface to an outer surface of the outer barrel outwardly at a first angle; providing an inner barrel within the outer barrel, the inner barrel having an outer surface adjacent to the inner surface of the outer barrel, the inner barrel including a second channel extending longitudinally along the inner barrel, the second channel being tapered on both a first side and a second side from an outer surface to an inner surface of the inner barrel inwardly at a second angle; and connecting the outer barrel to the inner barrel via a cam follower, where the cam follower includes: a flexure part having a first section with a first surface, a second section with a second surface, a spring section between the first section and the second section configured to pull the first section and the second section toward each other, the first section being tapered at a third angle opposite the first angle to maintain the first surface in contact with the first tapered channel of the outer barrel and the second section being tapered at a forth angle opposite the second angle to maintain the second surface in contact with the second tapered channel of the inner barrel; and wherein, the flexure part is arranged to maintain the cam follower within a center of the first and second channels as the inner barrel moves in relation to the outer barrel.

Any two or more of the features described in this specification, including in this summary section, may be combined to form implementations not specifically described in this specification. While aspects of the disclosure may relate to rifle scopes, telescopes, and microscopes, the discloses cam device, system, and method may be applied to any relatively small device that requires a more reliable auto-centre technique capable of reducing backlash. The techniques described herein may apply to any device and/or system that converts rotational motion to linear motion using a cam path and a cam follower constrained within some linear guide. Other types of systems, may include a laser system, milling system, surgical system, lasers, flashlights, designators, and or any system where possible shifting or backlash should be minimized.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

The application, in various implementations, addresses deficiencies associated with mitigating backlash in relatively small devices. The application includes exemplary devices, systems, and assemblies for providing reliable backlash prevention techniques.

Innovative aspects include two oppositely tapered cam paths (wrapped and linear) with a double tapered (hour-glass like) cam follower which has a flexure spring between opposite tapers which is then placed on a shaft that would have been the typical cam follower at this scale. Since both cam paths and ends of the cam follower are oppositely tapered with a spring pulling it all together, the follower always stays centered within both cam paths and will not bind due to the elastic spring compensating for the imperfect cam path walls.

Figure 1:
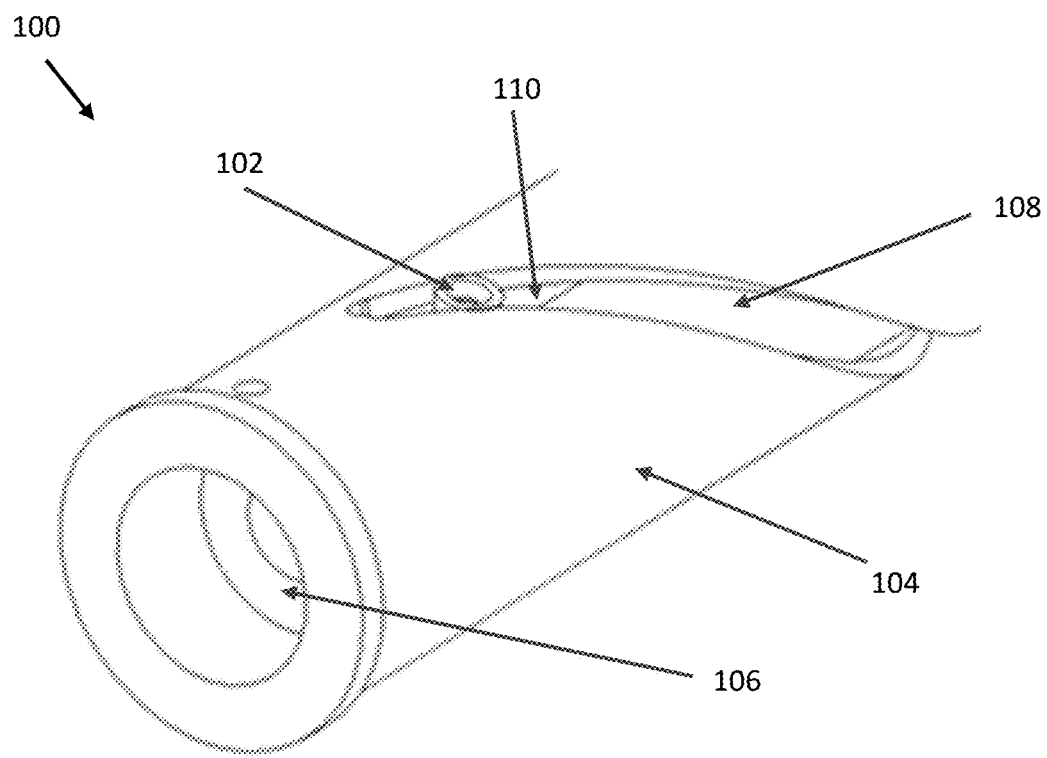
FIG. 1 shows a perspective view of a barrel cam with a dual taper cam follower.

FIG. 1 shows a perspective view of a barrel cam 100 with a dual taper cam follower 102. The barrel cam includes an outer barrel 104 and inner barrel 106. The outer barrel includes a first channel 108 that extends longitudinally along the outer barrel 104 in a non-linear, helical, and/or wrapped path. The inner barrel 106 includes a second channel 110 that extends longitudinally in a linear and/or substantially straight path along the inner barrel 106. The cam follower 102 extends between the first channel 108 and second channel 110 and aligns and/or holds the relative position between the outer barrel 104 and inner barrel 106 while they move relative to each other.

Figure 2:
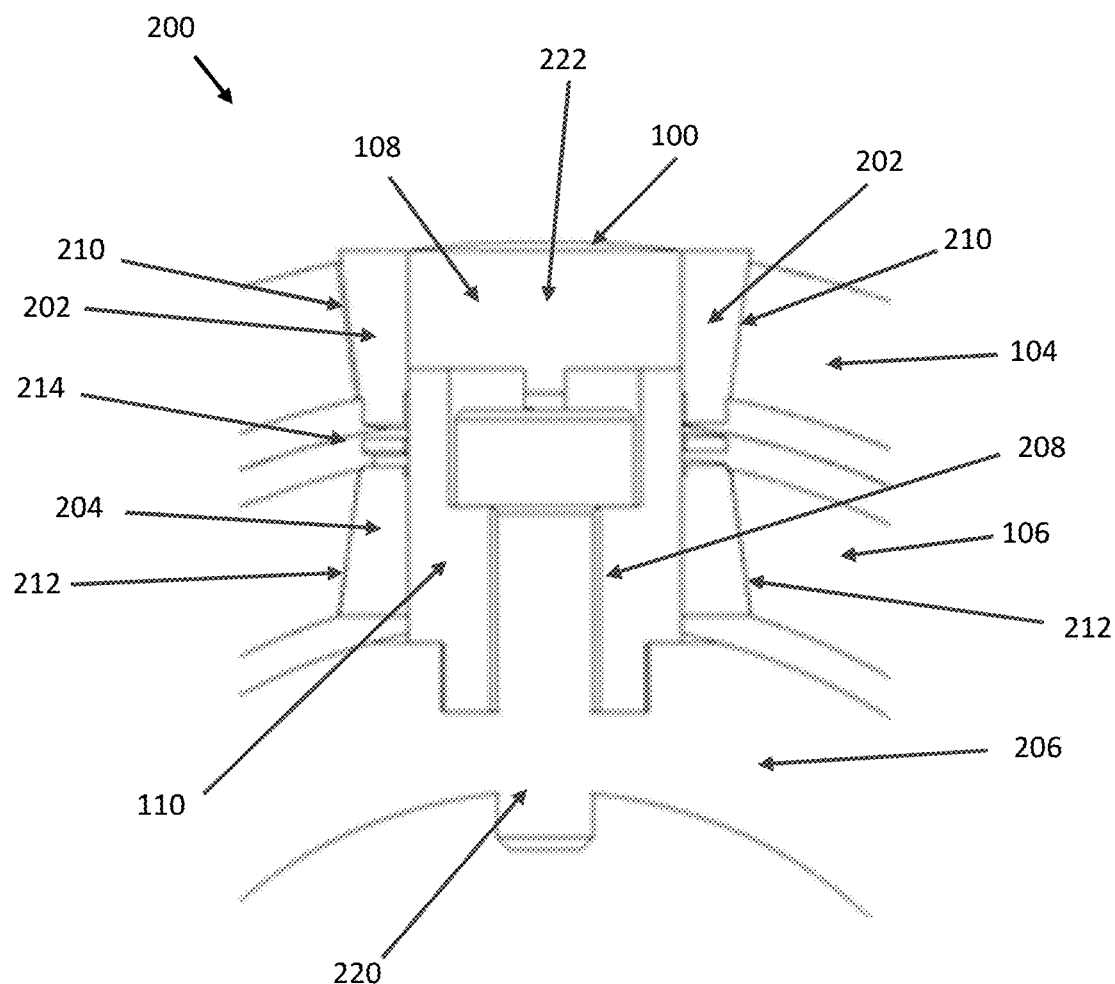
FIG. 2 shows a cross-sectional view of the barrel cam with a dual taper cam follower of FIG. 1.

FIG. 2 shows a cross-sectional view 200 of barrel cam 100 with the dual taper cam follower 102 of FIG. 1. Cam follower 102 includes a dual taper flexure part 222 that has an upper and/or first section 202 and a lower and/or second section 204, with a spring section 214 therebetween. The spring section 214 may include at least one helical spring and/or other spring types arranged to pull the first section 202 toward the second section 204. Cam follower 102 may include a cam follower base 206 such that the cam follower 102 is connectable to the cam follower base 206. The cam follower 102 may be connectable to the cam follower base via a threadable connection 220.

The first section 202 may include a surface 210 arranged to contact a surface of channel 108 while the second section 204 may include a surface 212 arranged to contact a surface of the second channel 110. The cam follower base 206 may be surrounded by inner barrel 106. Cam follower 102 may include a through hole 208 arranged to allow first section 202 to align with second section 204, with spring section 214 therebetween. In some implementations, first section 202 is tapered at a third angle opposite the first angle to maintain first surface 210 in contact with a surface along first tapered channel 108 of outer barrel 104 and second section 204 is tapered at a forth angle opposite the second angle to maintain second surface 212 in contact with a surface along second tapered channel 110 of inner barrel 106.

Figure 3:
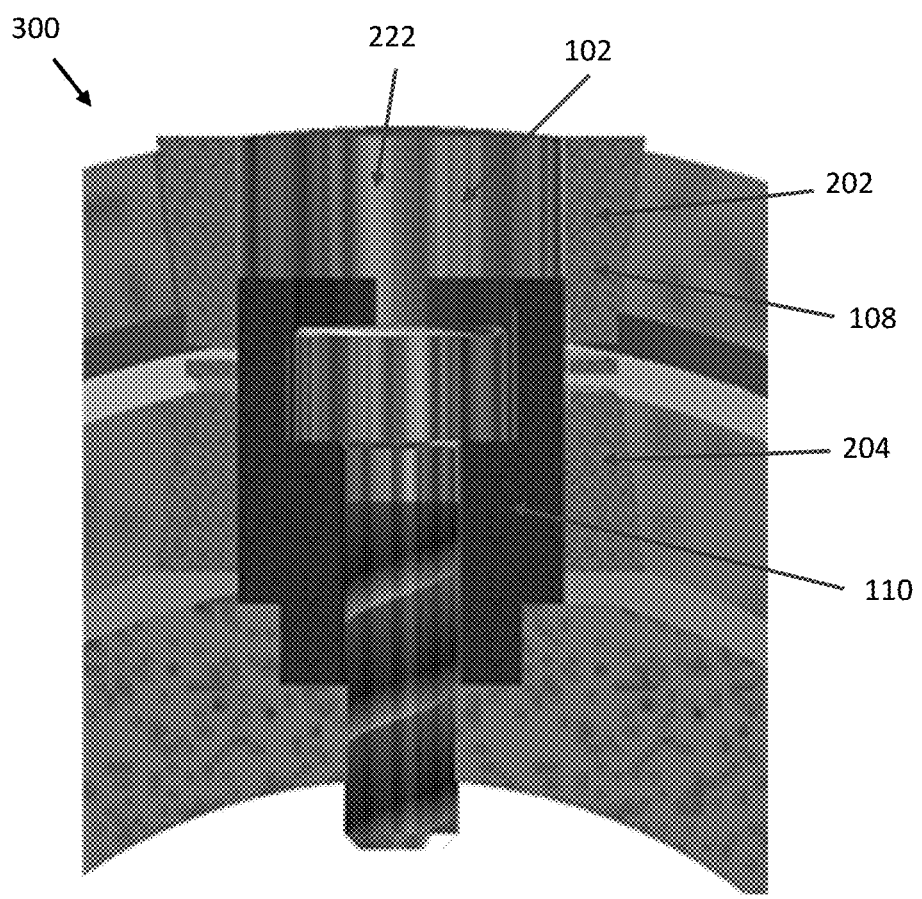
FIG. 3 shows another cross-sectional view of the cam follower and/or flexure part with a first portion in the wrapped cam guide path in the outer barrel and a second portion in the linear cam guide path in the inner barrel that are each tapered at opposite angles.

FIG. 3 shows another cross-sectional view 300 of cam follower 102 and flexure part 222 with first section 202 in the wrapped cam guide path or channel 108 of outer barrel 104 and second section 204 in the linear cam guide path or channel 110 of inner barrel 106 such that each are tapered at opposite angles.

Figure 4:
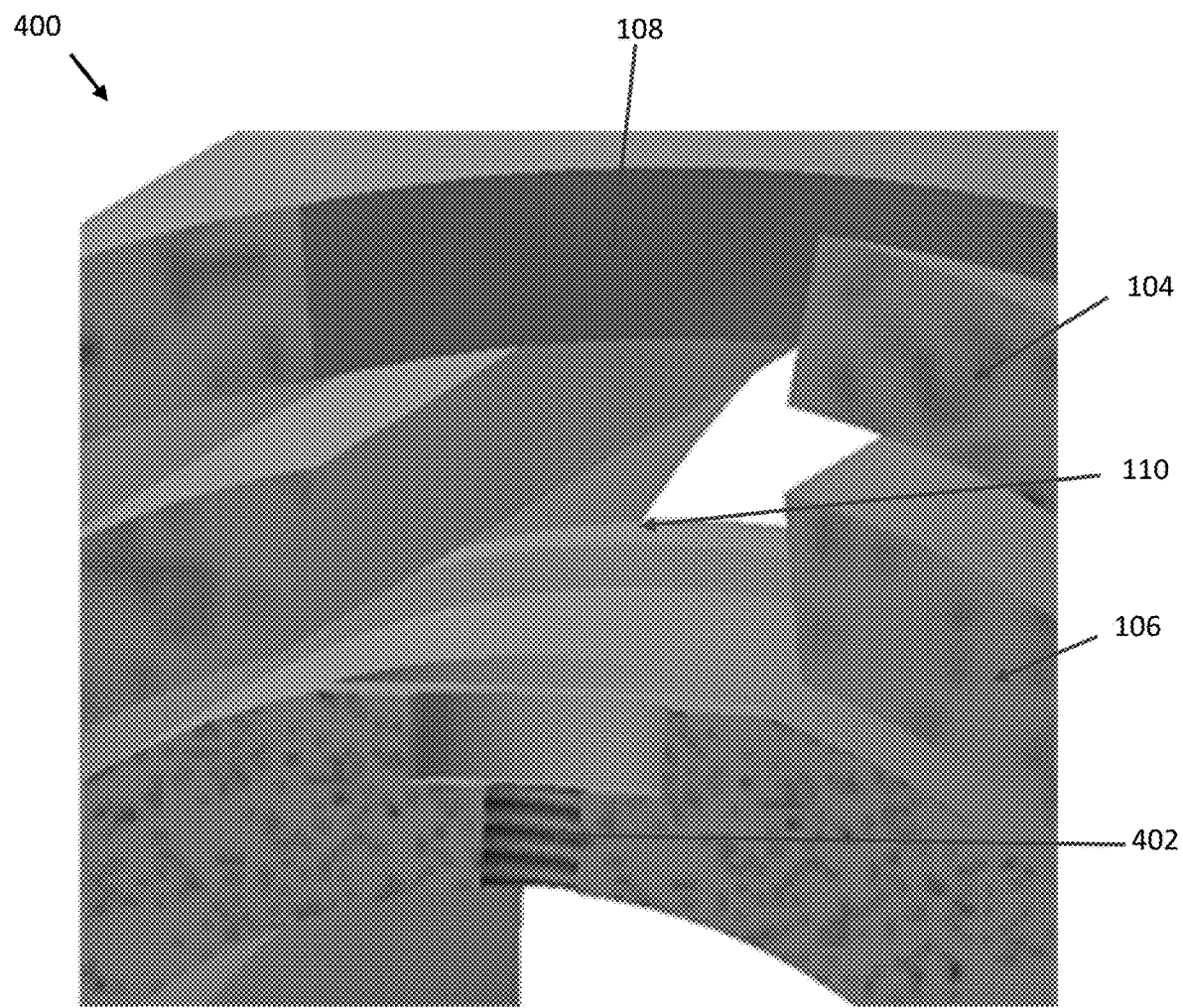
FIG. 4 shows another cross-sectional view of the wrapped cam path in the outer barrel and the linear cam path in the inner barrel that are each tapered at opposite angles.

FIG. 4 shows another cross-sectional view 400 of wrapped cam path or channel 108 in outer barrel 104 and linear cam path or channel 110 in inner barrel 106 that are each tapered at opposite angles. Threaded receiver 402 may be arranged to form part of connection 220 when cam follower 102 is engaged with cam follower base 206.

Figure 5:
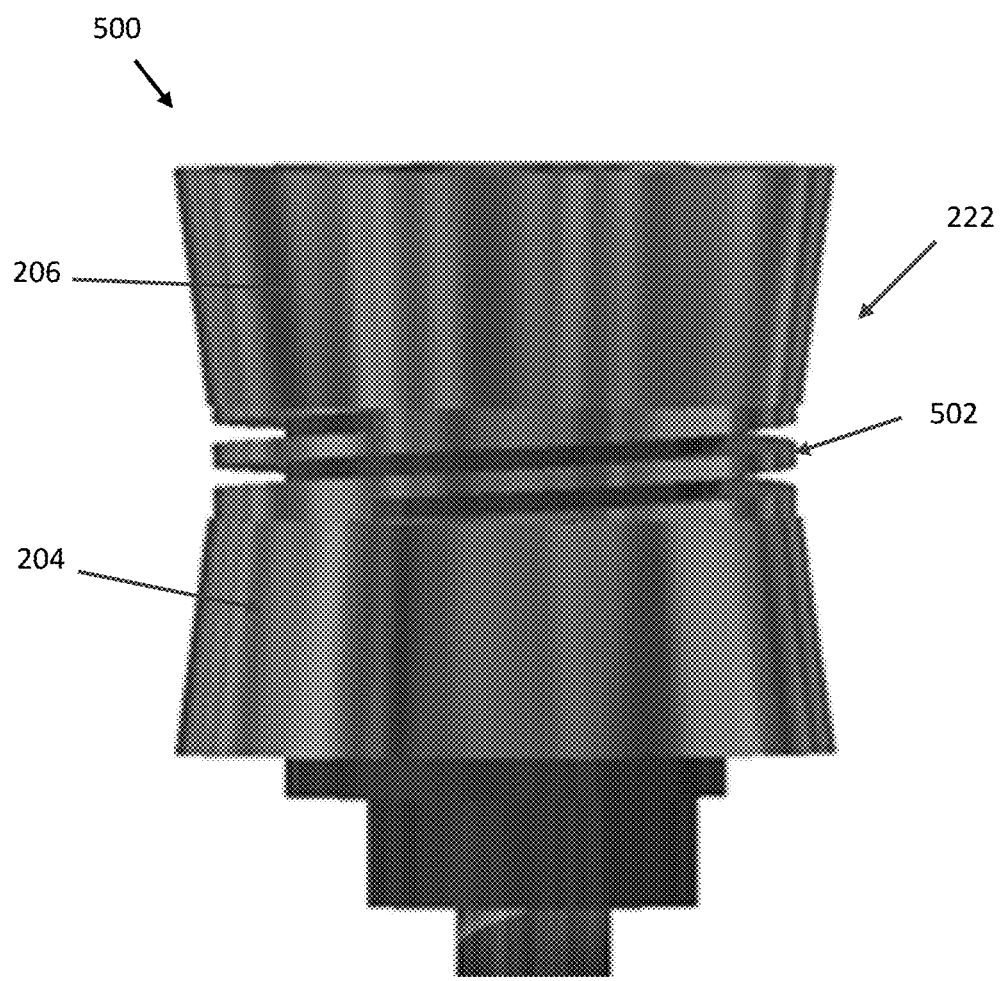
FIG. 5 shows a zoomed in view of the flexure part with spring arranged to pull the first portion and the second portion toward each other.

FIG. 5 shows a zoomed in view 500 of flexure part 222 of cam follower 102 with spring 502 arranged to pull first section 202 and second section 204 toward each other.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. An auto-center barrel cam comprising:
    an outer barrel including a first channel extending longitudinally along the outer barrel, the first channel being tapered on both a first side and second side from an inner surface to an outer surface of the outer barrel outwardly at a first angle;
    an inner barrel within the outer barrel, the inner barrel having an outer surface adjacent to the inner surface of the outer barrel, the inner barrel including a second channel extending longitudinally along the inner barrel, the second channel being tapered on both a first side and a second side from an outer surface to an inner surface of the inner barrel inwardly at a second angle; and
    a cam follower including:
        a flexure part having a first section with a first surface, a second section with a second surface, a spring section between the first section and the second section configured to pull the first section and the second section toward each other, the first section being tapered at a third angle opposite the first angle to maintain the first surface in contact with a surface along the first tapered channel of the outer barrel and the second section being tapered at a fourth angle opposite the second angle to maintain the second surface in contact with a surface along the second tapered channel of the inner barrel; and
    wherein, the flexure part is arranged to maintain the cam follower within a center of the first and second channels as the inner barrel moves in relation to the outer barrel.

2. The cam of claim 1, wherein the first section and the second section form an hour-glass like shape.

3. The cam of claim 1, wherein the flexure part is mounted on the cam follower.

4. The cam of claim 1, wherein the cam follower includes a connector arranged to connect the cam follower to a cam follower base.

5. The cam of claim 4, wherein the connector includes a screw part arranged to threadable engage with the cam follower base.

6. The cam of claim 1 comprising a through hole extending from the first section to the second section.

7. The cam of claim 1, wherein the first channel extends longitudinally along the outer barrel in at least one of a wrapped and non-linear path.

8. The cam of claim 7, wherein the second channel extends longitudinally along the inner barrel in a linear path.

9. The cam of claim 1, wherein the first angle and second angle is between 30 degrees and 90 degrees extending from the inner surface to an outer surface of the inner barrel and the outer barrel respectively.

10. The cam of claim 1, wherein the spring section includes a helical spring.

11. An optical scope for a firearm comprising:
    an optical assembly arranged to image a target; and
    an auto-center barrel cam including:
        an outer barrel including a first channel extending longitudinally along the outer barrel, the first channel being tapered on both a first side and second side from an inner surface to an outer surface of the outer barrel outwardly at a first angle;
        an inner barrel within the outer barrel, the inner barrel having an outer surface adjacent to the inner surface of the outer barrel, the inner barrel including a second channel extending longitudinally along the inner barrel, the second channel being tapered on both a first side and a second side from an outer surface to an inner surface of the inner barrel inwardly at a second angle; and
        a cam follower including:
            a flexure part having a first section with a first surface, a second section with a second surface, a spring section between the first section and the second section configured to pull the first section and the second section toward each other, the first section being tapered at a third angle opposite the first angle to maintain the first surface in contact with a surface along the first tapered channel of the outer barrel and the second section being tapered at a fourth angle opposite the second angle to maintain the second surface in contact with a surface along the second tapered channel of the inner barrel; and
        wherein, the flexure part is arranged to maintain the cam follower within a center of the first and second channels as the inner barrel moves in relation to the outer barrel.

12. The cam of claim 11, wherein the first section and the second section form an hour-glass like shape.

13. The cam of claim 11, wherein the flexure part is mounted on the cam follower.

14. The cam of claim 11, wherein, the cam follower includes a connector arranged to connect the cam follower to a cam follower base.

15. The cam of claim 14, wherein the connector includes a screw part arranged to threadable engage with the cam follower base.

16. The cam of claim 11 comprising a through hole extending from the first section to the second section.

17. The cam of claim 11, wherein the first channel extends longitudinally along the outer barrel in at least one of a wrapped and non-linear path.

18. The cam of claim 17, wherein the second channel extends longitudinally along the inner barrel in a linear path.

19. The cam of claim 11, wherein the first angle and second angel is between 30 degrees and 90 degrees extending from the inner surface of the outer barrel.

20. A method for manufacturing an auto-center barrel cam comprising:
- providing an outer barrel including a first channel extending longitudinally along the outer barrel, the first channel being tapered on both a first side and second side from an inner surface to an outer surface of the outer barrel outwardly at a first angle;
- providing an inner barrel within the outer barrel, the inner barrel having an outer surface adjacent to the inner surface of the outer barrel, the inner barrel including a second channel extending longitudinally along the inner barrel, the second channel being tapered on both a first side and a second side from an outer surface to an inner surface of the inner barrel inwardly at a second angle; and
- connecting the outer barrel to the inner barrel via a cam follower, the cam follower including:
  - a flexure part having a first section with a first surface, a second section with a second surface, a spring section between the first section and the second section configured to pull the first section and the second section toward each other, the first section being tapered at a third angle opposite the first angle to maintain the first surface in contact with a surface along the first tapered channel of the outer barrel and the second section being tapered at a fourth angle opposite the second angle to maintain the second surface in contact with a surface along the second tapered channel of the inner barrel; and
- wherein, the flexure part is arranged to maintain the cam follower within a center of the first and second channels as the inner barrel moves in relation to the outer barrel.

* * * * *